United States Patent Office 3,501,912
Patented Mar. 24, 1970

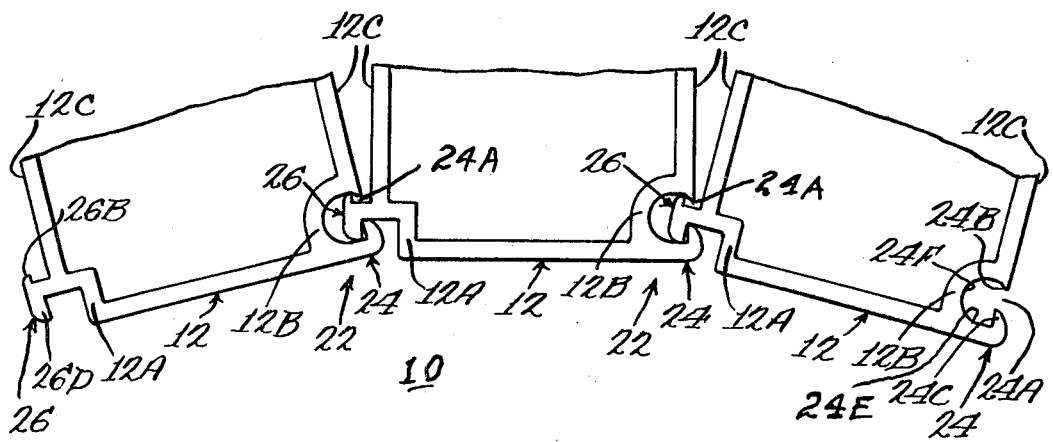
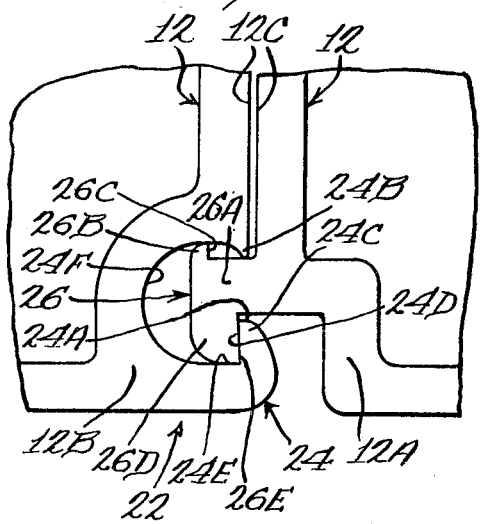
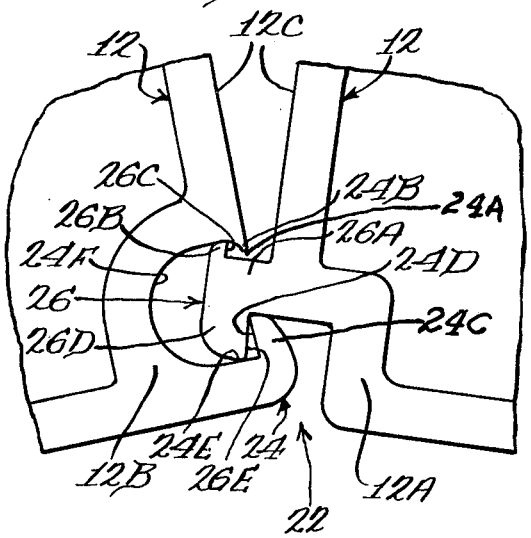

3,501,912
ARTICULATED COUPLING
Warren E. Gilson, 4801 Sheboygan Ave., and Robert E. Gilson, 4 Franklin Ave., both of Madison, Wis. 53705
Filed Feb. 1, 1968, Ser. No. 702,447
Int. Cl. F16g 13/04
U.S. Cl. 59—78                                                9 Claims

ABSTRACT OF THE DISCLOSURE

A snap type readily attachable and detachable interconnecting or coupling means including a first member having a longitudinal groove and a second member having a generally T-shaped projection extending into the groove for coupling the members in an articulated or hinge type manner to provide predetermined relative angular movement between the members. The coupling and uncoupling are preferably effected upon relative angular movement of the two members beyond the predetermined or normal range of angular movement to effect snap type coupling and uncoupling. Uncoupling cannot be effected by direct pull of the members.

CROSS-REFERENCES TO RELATED APPLICATIONS

The coupling means of the present application is disclosed in the copending application of Warren E. Gilson, Ser. No. 702,419, filed contemporaneously herewith and relating to "Coupled Articulated Containers and Apparatus Utilizing Same."

FIELD OF INVENTION

The invention pertains to couplings providing limited relative angular movement between adjacent members and may be used for a variety of purposes such as watch bands or interconnecting elements of various sorts.

DESCRIPTION OF THE PRIOR ART

Articulated coupling means of various types are known. It is desirable to provide a simple, compact and inexpensive snap type articulated coupling that cannot be uncoupled by direct pull.

SUMMARY

A simple, economical and effective articulated coupling utilizable for a variety of purposes is provided by the present invention. One of the coupling members has a longitudinal groove with opposed first and second lips defining a narrow opening extending lengthwise of the groove. A second coupling member has an arm and cross piece defining a generally T-shaped portion extending into the groove through said opening to effect the coupling of the members. The arm has a thickness slightly less than the width of and receivable in the opening and the cross piece has a length greater than the width of the opening and is insertable into the groove by placing a first portion of the cross piece into the groove through the opening and rotating the T-shaped portion to effect movement of the second portion of the cross piece into the groove through the opening thereby to couple the members. The members are made of relatively rigid but somewhat flexible material and are dimensioned so that the second portion of the cross piece has an interference fit past the second lip and is adapted to be snapped past it by relative rotary movement into the groove for coupling and out of the groove for uncoupling. The arrangement is also such that the coupling operations can be effected by sliding the members relative to each other with the T-shaped portion in the groove. The arrangement provides a desired angular movement between the coupling member and uncoupling cannot be effected by direct pull.

Other objects and advantages of the present invention will become apparent from the ensuing description of illustrative embodiments thereof, in which reference is had to the accompanying drawing, in which:

FIG. 1 is a fragmentary side view of a plurality of coupled elements illustrating the articulated or hinged connection or coupling providing limited angular movement between adjacent elements; and FIGS. 2 and 3 are fragmentary enlarged views illustrating two coupled elements in straight line and arcuate configuration, respectively, and showing details of the coupling.

Referring now to the drawing and first to FIG. 1, there is illustrated a coupled assembly 10 of individual elements 12 connected for limited angular movement relative to one another.

In accordance with the present invention, the elements are constructed so that they may be readily coupled to each other in hinged or articulated relationship as well as uncoupled, both the coupling and uncoupling being of the snap variety and effected by relative angular movement of the elements beyond their normal range or articulation or angular movement. Also, uncoupling cannot be effected by direct pull. The coupling will now be described particularly with reference to FIGS. 2 and 3. The couplings, indicated by reference character 22, include opposed coupling members 24 and 26 which are arranged so that they can be readily coupled and uncoupled as by snap action. The coupling is also such that it is difficult to effect uncoupling by a direct pull. One of the coupling members, for example member 24, is shown as having the configuration of a groove while the coupling member 26 takes the form of a hook. The members may be snapped together by forcing, with some pressure, the hook into the groove by rotary movement of the two members. Preferably, the grooves and hooks are located near corners of the elements 12, with the grooves at corner 12A and the hooks at the corner 12B.

Each of the grooves includes a longitudinal opening 24A the edges of which are defined by a small generally triangular forwardly extending projection 24B and a somewhat larger rearwardly extending portion 24C having an inner abutment surface 24D extending at an acute angle from an adjacent portion 24E of the groove. The portion 24E merges into a generally semicircular portion 24F that connects with the projection 24B.

The hook 26 includes a lateral extension 26A from which a small generally triangular portion 26B extends rearwardly and having a short surface 26C disposed at right angles with surface 26A. The hook includes also a forwardly extending relatively large projection 26D provided with a surface 26E having an acute angular relation with the front side of lateral extension 26A. Surfaces 24D of the groove and 26E of the hook are complementary to each other so that when the coupling members are connected to each other it is almost impossible to separate the two members with a direct pull, irrespective of the angular relationship.

The coupling of the elements is effected by lateral insertion of the hook projection 26D into opening 24A of an associated groove. The hook is snapped into the groove by a rotational motion of the two coupling members relative to each other. In effecting snap coupling the hook projection 26D rotates about the projection 24B of the groove to effect snapping of projection 26C past lip 24B, with which it has an interference fit.

Uncoupling is effected by rotation of the members in the opposite direction to snap hook projection 26B out of the groove past lip 24B.

The desired and limited normal range of angular movement of one part relative to another is determined by the configuration and dimensions of the coupling members. As best shown in FIG. 3, the limit of angular movement in one direction is determined by engagement of hook parts with groove parts. As illustrated, there is substantial engagement between the hook and groove structures such as to prevent uncoupling by direct pull. The engagement is between lip 24B and projection 26B, lip 24C and surface 26E, and between surface 24E and the end of projection 26D. The limit of movement in the opposite direction is substantially that shown in FIG. 2, whereat end portions 12C of the elements or projections thereon (not shown) may abut. It should be noted that coupling and uncoupling are effected by rotary movement of one member relative to another at an angular range outside the normal range. The illustrated construction provides about fifteen degrees of relative angular movement.

The elements 12 may have a length required by the intended use. They may have practically any desired width and the grooves and projections may extend the full width of the elements. They may be made as by molding of suitable material, such as plastics, e.g., polyethylene, polypropylene or acrylic resins, which have substantial rigidity but enough give to enable the members to be snap coupled as earlier described. Additionally, transversely extending stop defining projections may be provided to prevent longitudinal sliding movement of one member relative to another. If stops are not provided, it may be noted that coupling and uncoupling could be effected by sliding hook members into the groove members.

The coupling of the present invention can be made simply and economically with the elements 12. The latter may be, for example, the links of a watch band or the like or a variety of other devices.

While the present invention has been described in connection with the details of illustrative embodiments, it should be understood that such details are not intended to be limitative of the invention except insofar as set forth in the accompanying claims.

What is claimed as new and desired to be secured by Letters Patent of the United States is:

1. A coupling comprising a first member having a longitudinal groove with opposed first and second lips defining a narrow opening extending lengthwise of the groove, and a second member having an arm and cross piece defining a generally T-shaped portion extending into the groove through said opening to effect the coupling of the members, said arm having a thickness slightly less than the width of and receivable in the opening, and said cross piece having a length greater than the width of the opening and being angularly movable in said groove to provide relative angular movement between said members, said T-shaped portion being insertable into the groove through said opening by placing a first portion of the cross piece into the groove through the opening and rotating the T-shaped portion to effect movement of the second portion of the cross piece into and out of the groove through the opening.

2. A coupling as claimed in claim 1, wherein said members are made of relatively rigid but somewhat flexible material and are dimensioned so that the second portion of the cross piece has an interference fit past the second lip and is adapted to be snapped past it.

3. A coupling as claimed in claim 1, wherein the coupling between the members is such that uncoupling cannot be effected by direct pull separation of the members.

4. A coupling as claimed in claim 1, wherein the first portion of the cross piece and first lip have surfaces at acute angles to the arm which fully engage each other when the members are in aligned coupled relation.

5. A coupling as claimed in claim 4, wherein the second lip and the second portion of the cross piece are of generally triangular configuration and shorter than the first portion of the cross piece and first lip.

6. A coupling as claimed in claim 5, wherein the members are angularly movable a limited extent from a first relative position in which they are aligned and the said surfaces at acute angles are engaged and a second relative position in which the members are angularly displaced from each other to an extent determined by engagement of the arm with the first lip and of the second portion of the cross piece with the second lip.

7. A coupling as claimed in claim 1, wherein the groove, opening and T-shaped member are continuous throughout their lengths.

8. A coupling as claimed in claim 1 interconnecting adjacent ends of a plurality of elements.

9. A coupling as claimed in claim 5 interconnecting adjacent ends of a plurality of elements.

References Cited

UNITED STATES PATENTS

| 1,998,406 | 4/1935 | Gouverneur | 59—85 |
| 2,674,842 | 4/1954 | Hess | 59—80 |

FOREIGN PATENTS

| 249,460 | 4/1948 | Switzerland. |
| 269,586 | 10/1950 | Switzerland. |

CHARLES W. LANHAM, Primary Examiner

G. P. CROSBY, Assistant Examiner

U.S. Cl. X.R.

59—82